(12) United States Patent
Sadatoshi et al.

(10) Patent No.: US 6,214,952 B1
(45) Date of Patent: *Apr. 10, 2001

(54) PROPYLENE RANDOM COPOLYMER AND FILM LAMINATE THEREOF

(75) Inventors: Hajime Sadatoshi; Makoto Satoh; Naofumi Naga, all of Ichihara (JP)

(73) Assignee: Sumitomo Chemical Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,056

(22) Filed: Mar. 11, 1998

Related U.S. Application Data

(62) Division of application No. 08/802,411, filed on Feb. 18, 1997, now Pat. No. 5,830,968, which is a continuation of application No. 08/393,990, filed on Feb. 24, 1995, now abandoned.

(30) Foreign Application Priority Data

Feb. 25, 1994 (JP) .................................................... 6-028461
Oct. 26, 1994 (JP) .................................................... 6-262357

(51) Int. Cl.$^7$ .................................................... C08F 10/06
(52) U.S. Cl. .................. 526/160; 526/348; 526/348.2; 526/348.6; 526/943
(58) Field of Search ............................. 526/348.1, 348, 526/943, 348.2, 348.6, 160

(56) References Cited

U.S. PATENT DOCUMENTS

| | | | |
|---|---|---|---|
| 4,367,322 | 1/1983 | Shiga et al. | 526/137 |
| 5,336,746 * | 8/1994 | Tsutsui et al. | 526/348.6 |
| 5,618,895 | 4/1997 | Kerth et al. | 526/128 |
| 5,710,223 * | 1/1998 | Fukuoka et al. | 526/127 |

FOREIGN PATENT DOCUMENTS

| | | |
|---|---|---|
| 2142521 | 8/1995 | (CA). |
| 0126640 A2 | 11/1984 | (EP). |

(List continued on next page.)

OTHER PUBLICATIONS

Brintzinger et al., "Stereospecific Olefin Polymerization with Chiral Metallocene Catalysts", Angew. Chem. Int. Ed. Engl. 1995, 34, 1143–1170.

Grassi et al., "Microstructure of Isotactic Polypropylene Prepared with Homogenous Catalysis: Stereoregularity, Regioregularity and 1,3–Insertion", Macromolecules, vol. 21, No. 3, 1988, 617–622.

(List continued on next page.)

Primary Examiner—Paul Thibodeau
Assistant Examiner—D Lawrence Tarazano
(74) Attorney, Agent, or Firm—Pillsbury Madison & Sutro LLP

(57) ABSTRACT

A propylene random copolymer and a film laminate thereof is described having excellent blocking resistance and transparency and substantially maintaining favorable low-temperature heat-sealing properties after corona discharge treatment. The propylene random copolymer of the invention includes a propylene component and an α-olefin component having 4 to 10 carbon atoms, wherein the content of the α-olefin component is in the range of about 6% to about 40% by weight, the intrinsic viscosity [η] measured in tetralin at 135° C. is not lower than about 0.45 dl/g and not higher than about 5.0 dl/g, and the melting point (Tm) measured by a differential scanning calorimeter and the content of 20° C. xylene soluble fraction (CSX) fulfill a relationship of $$Tm \leq 140 - 35.693 \log_{10}(CXS).$$

14 Claims, 1 Drawing Sheet

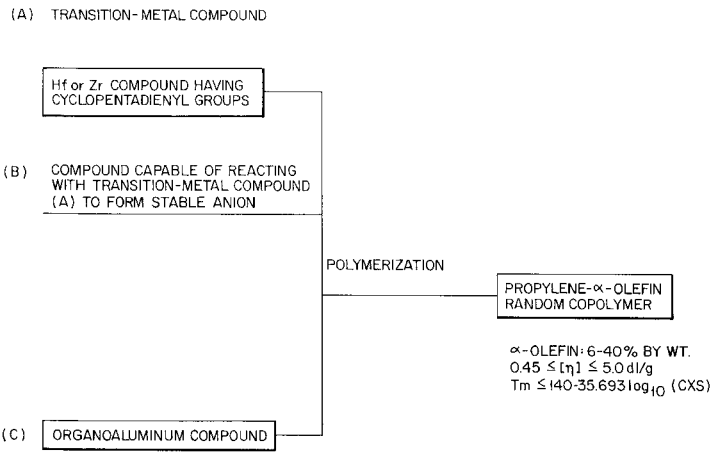

FOREIGN PATENT DOCUMENTS

| | | |
|---|---|---|
| 0318049 A1 | 5/1989 | (EP) . |
| 0395055 A1 | 10/1990 | (EP) . |
| 0426139 A2 | 5/1991 | (EP) . |
| 0464684 A2 | 1/1992 | (EP) . |
| 0495099 A1 | 7/1992 | (EP) . |
| 0577407 A1 | 1/1994 | (EP) . |
| 2027720 | 2/1980 | (GB) . |
| 62-119212 | 5/1987 | (JP) . |
| 2-255812 | 10/1990 | (JP) . |
| WO 94/28039 | 12/1994 | (WO) . |

OTHER PUBLICATIONS

Grassi, et al., "$^{13}$C NMR Analysis of Copolymers of Propene with $^{13}$C–Enriched Ethylene Prepared in the Presence of Different Stereospecific Catalysts" Gazetta Chimica Italiana, 118, 1988, 539–543.

* cited by examiner

FIG. 1

(A) TRANSITION-METAL COMPOUND
— Hf or Zr COMPOUND HAVING CYCLOPENTADIENYL GROUPS (B) COMPOUND CAPABLE OF REACTING WITH TRANSITION-METAL COMPOUND (A) TO FORM STABLE ANION (C) ORGANOALUMINUM COMPOUND

↓ POLYMERIZATION

PROPYLENE-α-OLEFIN RANDOM COPOLYMER

α-OLEFIN: 6-40% BY WT.
$0.45 \leq [\eta] \leq 5.0 \, dl/g$
$Tm \leq 140 - 35.693 \log_{10} (CXS)$

PROPYLENE RANDOM COPOLYMER AND FILM LAMINATE THEREOF

This application is a division of Ser. No. 08/802,411 filed Feb. 18, 1997, now U.S. Pat. No. 5,830,968, which is a continuation of Ser. No. 08/393,990 filed Feb. 24, 1995, now abandoned.

BACKGROUND OF THE INVENTION

1. Field of the Invention

The present invention relates to a propylene random copolymer and a film laminate thereof. More specifically, the present invention relates to a propylene random copolymer and a film laminate thereof that has favorable blocking resistance, transparency, and low-temperature heat-sealing properties and that is typically applied as a heat sealant.

2. Description of the Related Art

Polypropylene has many excellent physical properties and is accordingly used in many different applications. Propylene random copolymers, typically used in wrapping films, can be prepared by random copolymerization of propylene with ethylene and/or other α-olefins and have enhanced heat-sealing properties at low temperatures. These propylene random copolymers are generally produced with conventional Ziegler-Natta catalysts. The propylene random copolymers might have sufficient transparency and heat-sealing properties, which can be attributed to their low crystallinity and low melting point. However, the content of 20° C. xylene soluble fraction (CSX) in the propylene random copolymer, an undesirable property for food wrapping film application, greatly increases with increasing content of ethylene and/or α-olefin.

In addition, the heat sealant layer that is applied to the surface of the wrapping film is typically treated by corona discharge for improving printing properties. The corona discharge treatment, however, leads to decomposition of the propylene random copolymer in the heat sealant layer, thereby deteriorating the low-temperature heat-sealing properties of the wrapping film.

A method disclosed in JP-A-1-266,116 describes a propylene random copolymer having less content of undesirable 20° C. xylene soluble fraction (CXS) prepared by random copolymerization of propylene with ethylene and/or an α-olefin in the presence of a catalytic system comprising (1) a group IVB transition-metal compound having one or more cyclopentadienyl groups and (2) an alumoxane. Although the propylene random copolymer prepared by this method has a sufficiently low melting point, the copolymer still has a large CXS content and insufficient blocking resistance. Blocking resistance refers to the extent to which sheets or films stick to each other. Moreover, the catalytic residue of alumoxane is difficult to remove from the resulting propylene random copolymer which undesirably affects the optical properties of the propylene random copolymer.

In addition, a syndiotactic propylene-1-butene random copolymer containing 0.01 to 20% by weight of propylene is described in JP-A-4-175,317. This copolymer has a high content of 1-butene, which results in favorable low-temperature heat-sealing properties but insufficient blocking resistance.

In other work, a syndiotactic propylene-ethylene random copolymer containing 4.6% by weight of ethylene and having favorable low-temperature heat-sealing properties and favorable optical properties is described in JP-A-5-245,992. However, propylene-ethylene random copolymers generally have a large content of 20° C. xylene soluble fraction (CXS) and insufficient blocking resistance, and are thus not suitable for use as a sealant.

To date, propylene random copolymers that possess the contradictory properties of favorable blocking resistance and favorable low-temperature heat-sealing properties have not been prepared.

SUMMARY OF THE PRESENT INVENTION

One object of the present invention is to prepare a propylene random copolymer having excellent blocking resistance and transparency and yet substantially maintaining favorable low-temperature heat-sealing properties despite corona discharge treatment.

Another object of the present invention is to provide a film laminate comprising such a propylene random copolymer having favorable properties.

As a result of intensive studies, the inventors have found that these and other objects can be achieved by a propylene random copolymer having (1) a composition and intrinsic viscosity [η] in specific ranges, and (2) a specific relationship between melting point (Tm) and content of 20° C. xylene soluble fraction (CXS).

More specifically, the present invention is directed to a propylene random copolymer comprising a propylene component and an α-olefin component having 4 to 10 carbon atoms, wherein (A) the content of the α-olefin component is in a range of about 6% to about 40% by weight, (B) the intrinsic viscosity [η] of the propylene random copolymer, measured in tetralin at 135° C., is not lower than about 0.45 dl/g and not higher than about 5.0 dl/g, and (C) the melting point (Tm), measured with use of a differential scanning calorimeter, and the content of 20° C. xylene soluble fraction (CXS) for the propylene random copolymer fulfills the relationship $$Tm \leq 140 - 35.693 \log_{10}(CXS).$$

The present invention is also directed to a film laminate comprising the propylene random copolymer of the present invention laminated upon a base layer.

BRIEF DESCRIPTION OF THE DRAWINGS

FIG. 1 is a schematic flow chart illustrating preparation of a random copolymer according to the present invention.

DETAILED DESCRIPTION OF THE PRESENT INVENTION

In one embodiment of the present invention, the propylene random copolymer is prepared with use of a multi-component catalytic system. The catalytic system comprises the following essential catalytic components:

(1) a group IVB transition metal compound having one or more cyclopentadienyl groups;

(2) a compound capable of reacting with the group IVB transition-metal compound to form a stable anion; and (3) an organoaluminum compound.

The propylene random copolymer of the present invention can be prepared by copolymerizing propylene and an α-olefin. The α-olefin used herein contains 4 to 10 carbon atoms, and more specifically, 4 to 6 carbon atoms. A preferable example of α-olefin is 1-butene. 1-Pentene and 1-hexene can also be used. A single α-olefin or a mixture of two or more α-olefins can be used as the α-olefin component of the present invention. The content of the α-olefin component in the propylene random copolymer is within a range of about 6% to about 40% by weight, and preferably in a range of about 7% to about 35% by weight, and more preferably, in a range of about 15% to about 30% by weight.

The presence of the α-olefin component in amounts less than 6% by weight results in an excessively high melting point, which deteriorates the desirable low-temperature heat-sealing properties. The presence of the α-olefin component in amounts greater than 40% by weight, on the other hand, increases the 20° C. xylene soluble fraction and thereby deteriorates the blocking resistance.

The intrinsic viscosity [η] of the propylene random copolymer of the present invention measured in tetralin at 135° C. is not lower than about 0.45 dl/g and is not higher than about 5.0 dl/g, and more specifically, is not lower than about 0.45 dl/g and is not higher than about 3.0 dl/g. An intrinsic viscosity [η] lower than about 0.45 dl/g causes significant loss of clarity during preparation of a film. An intrinsic viscosity [η] higher than 5.0 dl/g, on the other hand, deteriorates processing properties.

The propylene random copolymer of the present invention will have a melting point (Tm), measured with use of a differential scanning calorimeter, and a content of 20° C. xylene soluble fraction (CXS) that fulfills a specific relationship:

$$Tm \leq 140 - 35.693 \log_{10}(CXS)$$

or more preferably, the relationship:

$$Tm \leq 137 - 35.693 \log_{10}(CXS).$$

A propylene random copolymer which does not fulfill this relationship does not simultaneously provide the hitherto believed to be contradictory properties: favorable low-temperature heat-sealing properties and favorable blocking resistance.

Again, it is essential that the propylene random copolymer of the present invention has the content of α-olefin component and the intrinsic viscosity [η] in the ranges specified above and fulfills the specific relationship between the melting point (Tm) and the content of 20° C. xylene soluble fraction (CXS). Deviation from the specific ranges or relationship does not result in a propylene random copolymer having simultaneously excellent blocking resistance and the ability to substantially maintain favorable low-temperature heat-sealing properties despite corona discharge treatment.

Optionally, in addition to the propylene and the at least one α-olefin monomer, ethylene can also be copolymerized during preparation of the propylene random copolymer of the present invention as long as the ethylene does not damage the desirable physical properties of the resulting copolymer.

A spectral signal attributable to a structure having two or more adjacent methylene units —$(CH_2)$— in the molecular chain of the propylene random copolymer can be detected by carbon NMR spectroscopy. This evidence indicates that head-to-head linkages and tail-to-tail linkages form during copolymerization of propylene and α-olefin. The structure can be detected from NMR analysis when ethylene is not used as comonomer. A sample solution for NMR analysis can be prepared by dissolving approximately 150 mg of the copolymer in 3 mL of o-dichlorobenzene in an NMR sample tube (10 mm diameter). The spectra signals are measured by $^{13}$C-NMR spectroscopy under the following conditions: temperature of measurement=135° C.; frequency of measurement=67.8 MHz; spectral width=3,000 Hz; filter width=10,000 Hz; pulse interval=10 seconds; pulse width=45 degrees; and number of accumulations=5,000–7,000.

Spectra thus obtained were analyzed according to a method proposed by Kazuo Soga, Takeshi Shiono, and Walter Kaminsky (Makromol. Chem., Rapid Commun., 8, 305 (1987)) or a method proposed by Alfonso Grassi, Adolfo Zambelli, Luigi Resconi, Enrico Albizzati, and Romano Mazzocchi (Macromolecules, 21, 617 (1988)), the complete disclosures of which are hereby incorporated by reference.

The propylene random copolymer of the present invention can be prepared with use of a catalytic system proposed by J. C. W. Chien et al. (Applied Organometal Chem., 7, 71 (1993)) or J. A. Ewen ('Catalyst Design for Tailor-made Polyolefins', K. Soga and M. Terano, Eds.; Elsevier, Amsterdam, Oxford, New York, Tokyo, 1994, pg. 405), the complete disclosures of which are hereby incorporated by reference. The catalytic system applied to the preparation of the propylene random copolymer includes:

(1) a group IVB transition metal compound having one or more cyclopentadienyl groups;

(2) a compound capable of reacting with the transition-metal compound (1) to form a stable anion; and (3) an organoaluminum compound.

The catalytic component (1), the group IVB transition metal compound having one or more cyclopentadienyl groups, preferably contains a cycloalkadienyl group or its substituent. For example, the catalytic component (1) can be a zirconium or hafnium compound having a multidentate ligand prepared by linking at least two groups selected from the group consisting of an indenyl group, a substituted indenyl group, and a partial hydride of the substituted indenyl group bridged with each other via lower alkylene group.

The transition metal compound (1) can be, for example, a zirconium or hafnium compound having a chiral cyclopentadienyl ring.

Preferable examples of the transition-metal compound (1) include stereo rigid chiral compounds of zirconium and hafnium, such as for example (a) the ethylenebis(indenyl)zirconium dichloride compound described by H. H. Brintzinger et al., J. Organometal. Chem., 288, 63 (1985); (b) the ethylenebis(indenyl)hafnium dichloride compounds described in J. Am. Chem. Soc., 109, 6544 (1987); (c) dimethylsilylenebis(methylcyclopentadienyl) zirconium dichloride described by H. Yamazaki et al., Chemistry Letters, 1853 (1989), and (d) dimethylsilylenebis(1-indenyl) zirconium dichloride described by W. Spaleck et al., Angew. Chem. Int. Ed. Engl., 31, 1347(1992), the complete disclosures of which are hereby incorporated by reference.

Additional examples for catalyst component (1) include ethylenebis(1-indenyl)zirconium dichloride, ethylenebis(4,5,6,7-tetrahydro-1-indenyl)zirconium dichloride, ethylenebis (4-methyl-1-indenyl)zirconium dichloride, ethylenebis(5-methyl- 1-indenyl)zirconium dichloride, ethylenebis(6-methyl-1-indenyl)zirconium dichloride, ethylenebis(7-methyl-1-indenyl)zirconium dichloride, ethylenebis(2,3-dimethyl-1-indenyl)zirconium dichloride, ethylenebis (4,7-dimethyl-1-indenyl)zirconium dichloride, dimethylsilylbis (methylcyclopentadienyl)zirconium dichloride, dimethylsilylbis(t-butylcyclopentadienyl) zirconium dichloride, dimethylsilylbis (dimethylcyclopentadienyl) zirconium dichloride, dimethylsilylbis(trimethylcyclopentadienyl) zirconium dichloride, dimethylsilyl(methylcyclopentadienyl)

(dimethylcyclopentadienyl)zirconium dichloride, dimethylsilyl(methylcyclopentadienyl) (t-butylcyclopentadienyl)zirconium dichloride, dimethylsilylbis(1-indenyl)zirconium dichloride, dimethylsilylbis(4,5,6,7-tetrahydro-1-indenyl) zirconium dichloride, dimethylsilylbis(4-methyl-1-indenyl)zirconium dichloride, dimethylsilylbis(5-methyl-1-indenyl)zirconium dichloride, dimethylsilylbis(6-methyl-1-indenyl)zirconium dichloride, dimethylsilylbis(7-methyl-1-indenyl)zirconium dichloride, dimethylsilylbis(2,3-dimethyl-1-indenyl) zirconium dichloride, dimethylsilylbis(4,7-dimethyl-1-indenyl)zirconium dichloride, ethylenebis(1-indenyl) hafnium dichloride, ethylenebis(4,5,6,7-tetrahydro 1-indenyl)hafnium dichloride, ethylenebis(4-methyl-1-indenyl)hafnium dichloride, ethylenebis(5-methyl-1-indenyl)hafnium dichloride, ethylenebis(6-methyl-1-indenyl)hafnium dichloride, ethylenebis(7-methyl-1-indenyl)hafnium dichloride, ethylenebis(2,3-dimethyl-1-indenyl)hafnium dichloride, ethylenebis(4,7-dimethyl-1-indenyl)hafnium dichloride, dimethylsilylbis(methylcyclopentadienyl)hafnium dichloride, dimethylsilylbis(t-butylcyclopentadienyl)hafnium dichloride, dimethylsilylbis(dimethylcyclopentadienyl) hafnium dichloride, dimethylsilylbis (trimethylcyclopentadienyl)hafnium dichloride, dimethylsilyl(methylcyclopentadienyl) (dimethylcyclopentadienyl)hafnium dichloride, dimethylsilyl(methylcyclopentadienyl) (t-butylcyclopentadienyl)hafnium dichloride, dimethylsilylbis (1-indenyl) hafnium dichloride, dimethylsilylbis(4,5,6,7-tetrahydro-1-indenyl)hafnium dichloride, dimethylsilylbis (4-methyl-1-indenyl)hafnium dichloride, dimethylsilylbis (5,methyl-1-indenyl)hafnium dichloride, dimethylsilylbis (6-methyl-1-indenyl)hafnium, dichloride, dimethylsilylbis (7-methyl- 1-indenyl)hafnium dichloride, dimethylsilylbis (2,3-dimethyl-1-indenyl)hafnium dichloride, and dimethylsilylbis(4,7-dimethyl-1-indenyl)hafnium dichloride.

Preferable examples of the compound (2) capable of reacting with the transition-metal compound (1) to form a stable anion include tetrakis(pentafluorophenyl) borates and tetrakis(pentafluorophenyl) aluminates, such as for example trityltetrakis(pentafluorophenyl) borate, N,N-dimethylaniliniumtetrakis(pentafluorophenyl) borate, and trityltetrakis(pentafluorophenyl) aluminate.

The organoaluminum compound (3) has at least one Al—C bond in the molecular structure. Concrete examples of the organoaluminum compound (3) include: trialkylaluminums, such as diethylaluminum halide and diisobutylaluminum halide; mixtures of trialkylaluminum and dialkylaluminum halide; and alkylalumoxane, such as, for example tetraethyldialumoxane and tetrabutyldialumoxane.

Trialklaluminums, mixtures of trialkylaluminum and dialkylaminum halide, and alkylalumoxane are preferable for the organoaluminum compound (3). Especially preferable are,triethylaluminum, triisobutylaluminum, mixtures of triethylaluminum and diethylaluminum chloride, and tetraethyldialumoxane.

Triethylaluminum and triisobutylaluminum are especially preferable for the organoaluminum compound (3).

The amounts of catalytic components (1) and (2) can be readily determined by those skilled in the art. The content of the organoaluminum compound (3) can range from 1 to 1,000 moles with respect to one mole of the transition metal atom of the transition-metal compound (1). The preferable range is 5 to 600 moles of component (3).

The respective catalytic constituents (1) through (3) can be supplied to a reactor in an atmosphere of nitrogen, argon, or another inert gas in the presence of monomers under dry conditions. The catalytic constituents (1) through (3) can be supplied separately, or two of the constituents can be previously brought into contact with each other.

The temperature of polymerization can range from about −30° C. to about 300° C., while the preferable range is about 0° C. to about 280° C., or more preferably about 20° C. to about 250° C.

Although the pressure of polymerization is not specifically limited, a pressure range of about 1–150 atmospheres is preferable from the industrial and economical points of view. The polymerization time depends upon the type of target polymer and the reaction system, but generally, polymerization times range from about 5 minutes to about 40 hours.

Polymerization can be carried out continuously or by batch. Other possible polymerization processes include slurry or solvent polymerization using an inactive hydrocarbon solvent such as, for example, propane, butane, pentane, hexane, heptane, or octane. Liquid-phase or gas-phase polymerization without use of solvent can be carried out.

A chain transfer agent such as hydrogen can be added to regulate the molecular weight of the copolymer prepared according to the present invention.

The propylene copolymer of the present invention is not believed to be restricted by the selection of the specific catalysts or processes for copolymer preparation mentioned above.

Appropriate antioxidants, neutralizers, lubricants, antiblocking agents, and anti-static agents can be added to the random copolymer of the present invention as needed, as long as these additives do not counteract the advantages of the invention.

The propylene random copolymer of the present invention can be laminated onto a base layer to form a film laminate which has excellent blocking resistance and transparency and substantially maintains favorable low-temperature heat-sealing properties after corona discharge treatment.

The film laminate of the present invention can be prepared by laminating a layer of the propylene random copolymer on one or both faces of a base film or sheet. A crystalline α-olefin polymer, especially, crystalline polypropylene, is preferable for the base material. The crystalline polypropylene contains at least 80% by weight of boiling heptane insoluble fraction, and has an intrinsic viscosity [η] within a range of about 1.3 to 4.2 dl/g, and a propylene component of not less than about 95% in the polymer. The crystalline polypropylene can be, for example, a copolymer containing ethylene, 1-butene, or 1-hexene at the concentration of not greater than about 5%.

The film laminate of the invention can be prepared by, various methods such as, for example (a) bonding a sheet of the propylene random copolymer upon a base layer with use of an adhesive intermediate layer. The selection of the adhesive and the conditions for adhesive application can be readily determined by those skilled in the art. The laminate is made to pass through a pair of pressure rollers. (b) applying the propylene random copolymer dissolved or dispersed in toluene or another solvent onto the base layer; (c) extruding a melt of the propylene random copolymer to coat the base layer with the copolymer; or (d) extruding a melt of the propylene random copolymer and a molten base polymer separately into a common die and joining the molten copolymer and base polymer with each other inside or at a port of the die.

It is preferable to stretch the film laminate of the invention uniaxially or biaxially after laminating the propylene random copolymer. An oriented film laminate can be manufactured according to various known processes.

A first process for orientation includes the steps of: (a) preparing a sheet laminate by mixing a melt of the propylene random copolymer with a molten base polymer inside or at a port of a die for extrusion molding; and (b) stretching the sheet laminate biaxially.

A second process includes the steps of: (a) extruding a laminate of the propylene random copolymer onto a base sheet to prepare a sheet laminate; and (b) stretching the sheet laminate biaxially.

A third process includes the steps of: (a) stretching a hot base sheet uniaxially in the MD direction with a series of rolls including metal rolls; (b) extruding a laminate of the propylene random copolymer onto the uniaxially oriented base; and (c) stretching the whole sheet laminate in the TD direction.

The film laminate thus manufactured has excellent low-temperature heat-sealing properties as well as sufficient transparency, blocking resistance, and scratch resistance, and can thus be favorably applied to various fields.

As described previously, the invention provides a propylene random copolymer having excellent blocking resistance and transparency and substantially maintaining favorable low-temperature heat-sealing properties after corona discharge treatment. The invention also provides a film laminate prepared from such a propylene random copolymer. The propylene random copolymer is favorably applicable as a heat sealant, while the film laminate is suitable for wrapping films. In particular, the film laminate obtained by the process of the invention has a small CXS content and is thus suitable for food-wrapping films.

A propylene random copolymer and a film laminate thereof has been described in JP-6-028,461, filed in Japan on Feb. 25, 1994, and JP-6-262,357, filed in Japan on Oct. 26, 1994, the complete disclosures of which are hereby incorporated by reference.

EXAMPLES

The objects and features of the present invention will become more apparent from the following exemplification of the present invention. The examples below are only illustrative and are not restrictive in any sense.

Various measurements and processes were executed in the following manner.
(1) Content of 1-Butene: % by weight
The content of 1-butene was measured by $^{13}C$ nuclear magnetic resonance spectroscopy.
(2) Melting Point (Tm) : ° C.
A differential scanning calorimeter (DSC by the Perkin-Elmer Corporation) was used for the measurement. A sample (10 mg) was held molten at 220° C. in an atmosphere of nitrogen for five minutes and then cooled at a rate of 5° C./minute to a temperature of 50° C. for crystallization. The sample was then heated at a rate of 10° C./minute, and the temperature of the maximum peak of the endothermic curve obtained was designated as the melting point.
(3) Heat-Sealing Temperature: ° C.
Sealant surfaces of films were superposed upon each other and set in a heat sealer. A sealed film of 25 mm wide was prepared by applying a load of 2 kg/cm$^2$ for 2 seconds in the heat sealer and left overnight. The temperature of the heat sealer that provided a peeling resistance of 300 g/25 mm under conditions of a peel rate of 200 mm/minute at 23° C. and a peeling angle of 180° was specified as the heat-sealing temperature.

(4) Content of 20° C. Xylene Soluble Fraction (CXS): % by Weight
A sample (5 g) of propylene random copolymer was completely immersed in 500 ml of boiled xylene, cooled to the temperature of 20° C., and left at least four hours. After a precipitate was filtered out, the filtrate was evaporated and dried under reduced pressure at 70° C. The weight of the dried filtrate was then measured by % by weight.
(5) Blocking Resistance: kg/12 cm$^2$
Two film sheets were superposed upon each other by applying a load of 500 g/12 cm$^2$ at the temperature of 60° C. for 3 hours. A sample piece cut to a size of 3 cm×10 cm was filed to a jig to have a contact surface of 3 cm×4 cm. The blocking resistance was measured as the load required for completely peeling the film off when the test sample was moved at a rate of traveled load of 20 g/minute.
(6) Corona Discharge Treatment
A laminator (Tanabe Plastics Co., Ltd.,) and a radio-frequency power source (Kasuga Electric Co., Ltd.) were used for corona discharge treatment. The conditions were a line rate of 30 m/minute and a corona discharge pressure of 160 V.
(7) Transparency (Total Haze): %
The transparency of a film cut to a size of approximately 50 mm×50mm was measured according to JIS K6741.
(8) Existence of Two or More Adjacent Methylene Units
The existence of the structure having two or more adjacent methylene units was measured with an NMR spectrometer (Model EX-270 by JEOL Ltd.) according to the method described hereinabove.

The following were used for the catalytic component (1), the group IVB transition metal compound having one or more cyclopentadienyl groups, and the catalytic compound (2), the compound capable of reacting with the transition-metal compound to form a stable anion.
(1) Transition-Metal Compound
Ethylenebis(indenyl)zirconium dichloride: commercially available from Nippon Fine Chemical Co., Ltd.
(2) Compound Capable of Reacting with a Transition-Metal Compound to Form a Stable Anion
Trityltetrakis(pentafluorophenyl) borate: commercially available from TOSOE AKZO Corporation.

Example 1

Polymerization
A 1-liter stainless steel autoclave equipped with stirrer was purged with nitrogen gas. Twenty-eight grams of liquified 1-butene and 252 grams of liquified propylene were introduced into the autoclave, and the autoclave was cooled to a polymerization temperature of 0° C.

A 100 mL flask with a magnetic stirrer was also purged with nitrogen gas. In an atmosphere of nitrogen, 10 mL of toluene that was purified with activated alumina, 3.5 mmol of triethylaluminum, and 5.6 μmol of ethylenebis(indenyl) zirconium dichloride were mixed with stirring for five minutes at ambient temperature. The mixture was then introduced into the 1 liter autoclave described above. After a solution of 5.6 μmol trityltetrakis(pentafluorophenyl) borate dissolved in 5 mL of toluene was further introduced into the autoclave, the autoclave was kept at 0° C. for 0.7 hours for polymerization. The polymerization was stopped by injection of 10 mL of isobutyl alcohol with stirring for another 30 minutes. Non-reacted monomers were purged from the product of polymerization, and the contents of the autoclave were poured into approximately 2 liters of ethanol. Polymers that precipitated were dried at 60° C. for 4 hours to yield 39 grams of a propylene-1-butene copolymer. The content of 1-butene in the copolymer was determined to be 7.2% by weight by $^{13}$C-nuclear magnetic resonance spectroscopy. The melting point was measured to be 137° C. with the differential scanning calorimeter. The intrinsic viscosity [η] measured in tetralin at 135° C. was 0.60 dl/g.

Preparation of Film and Evaluation of Physical Properties

After 0.2 parts by weight of Sumilizer BHT (a phenolic antioxidizer, Sumitomo Chemical Co., Ltd.), 0.05 parts by weight of Irganox 1010 (a phenolic antioxidizer, Ciba-Geigy Ltd.), and 0.1 parts by weight of calcium stearate were added to 100 parts by weight of the copolymer, the resultant mixture was blended with a small-sized roll kneader for 10 minutes and cut into pellets. A 90 mm×90 mm sheet laminate, which consists of a polypropylene layer of 500 μm thick (polypropylene: FS2011D manufactured by SUMITOMO CHEMICAL CO., LTD.; melt flow rate=2.2 to 2.8 g/10 minutes: density=0.902 g/cm³, and ethylene content= 0.3 to 0.5% by weight; CXS=3.5% by weight, Tm=158° C.) and a sealant layer of 100 μm thick prepared from the copolymer was preheated at 150° C. for 3 minutes and stretched at a rate of 5 m/minute and a draw ratio of (X×Y)=5×5 times with a portable biaxial stretching machine (by Toyo Seiki Seisaku-sho Ltd.) to a film of 22 μm thick. The heat-sealing temperature of the film was 121° C. both before and after the corona discharge treatment. Substantially no blocking was observed. The blocking resistance was 0 kg/12 cm², and the total haze was equal to 1.4%. The results of evaluation are shown in Table 1.

Example 2

Except that 56 grams of liquified 1-butene and 224 grams of liquified propylene were used for polymerization and that the polymerization time was 1.5 hours, the procedures of Example 1 were repeated for Example 2 to yield 23 grams of a propylene-1-butene copolymer. The content of 1-butene in the copolymer obtained was measured to be 18.9% by weight. The melting point and the intrinsic viscosity [η] were respectively equal to 119° C. and 0.57 dl/g. The heat-sealing temperature of a film having a sealant layer prepared from the copolymer was 101° C. prior to corona discharge treatment and 104° C. after corona discharge treatment. The blocking resistance was 0.27 kg/12 cm², and the total haze was 1.3%. The results of the evaluation are shown in Table 1.

Example 3

Except that 84 grams of liquified 1-butene and 190 grams of liquified propylene were used for polymerization and that the polymerization time was 1.5 hours, the procedures of Example 1 were repeated for Example 3 to yield 31 grams of a propylene-1-butene copolymer. The content of 1-butene in the copolymer obtained was 25.2% by weight. The melting point and the intrinsic viscosity [η] were respectively 108° C. and 0.55 dl/g. The heat-sealing temperature of a film having a sealant layer prepared from the copolymer was 89° C. prior to corona discharge treatment and 91° C. after corona discharge treatment. The blocking resistance was 0.50 kg/12 cm², and the total haze was 0.9%. The results of the evaluation are shown in Table 1.

Example 4

Except that 4.9 μmol ethylenebis(indenyl)zirconium dichloride and 4.9 μmol trityltetrakis(pentafluorophenyl) borate were used for polymerization and that the polymerization was continued at 25° C. for 1.3 hours, the procedures of Example 1 were repeated for Example 4 to yield 132 grams of a propylene-1-butene copolymer. The content of 1-butene in the copolymer obtained was 7.8% by weight. The melting point and the intrinsic viscosity [η] were respectively 132° C. and 0.46 dl/g. The heat-sealant temperature of a film having a sealant layer prepared from the copolymer was 120° C. prior to corona discharge treatment and 117° C. after corona discharge treatment. The blocking resistance was 0.35 kg/12 cm², and the total haze was 0.9%. The results of the evaluation are shown in Table 1.

Example 5

Polymerization

A 3-liter stainless steel autoclave equipped with a stirrer was purged with nitrogen gas. After 1.0 liter of toluene that had been purified with activated alumina, 52 grams of liquified 1-butene, and 105 grams of propylene gas were introduced into the autoclave, the autoclave was heated to a polymerization temperature of 50° C.

A 100 mL flask with a magnetic stirrer was also purged with nitrogen gas. In an atmosphere of nitrogen, 10 mL of toluene that had been purified with activated alumina, 4.3 μmol of triisobutylaluminum, and 8.5 μmol of ethylenebis (indenyl)hafnium dichloride were mixed with stirring for five minutes at ambient temperature. The mixture was then introduced together with propylene gas into the 3 liter autoclave described above. After a solution of 8.5 μmol trityltetrakis(pentafluorophenyl) borate dissolved in 4 ml of toluene was further introduced with propylene gas into the autoclave, polymerization was executed with a continuous supply of propylene gas at a pressure of approximately 6.0 kg/cm² and a temperature of 50° C. for 1.5 hours. The polymerization was stopped by injection of 10 mL of isobutyl alcohol with stirring for another 30 minutes. Non-reacted monomers were purged from the product of polymerization, and the contents of the autoclave were poured into approximately 5 liters of ethanol. Polymers precipitated were dried at 60° C. for four hours to yield 65 grams of a propylene-1-butene copolymer. The content of 1-butene in the copolymer was determined to be 14.1% by weight by $^{13}$C-nuclear magnetic resonance spectroscopy. The melting point was measured to be 112° C. with the differential scanning calorimeter. The intrinsic viscosity [η] measured in tetralin at 135° C. was 2.26 dl/g.

Preparation of Film and Evaluation of Physical Properties

The preparation of a film and evaluation of physical properties of the film were executed in the same manner as for Example 1. The heat-sealing temperature of the film having a sealant layer prepared from the copolymer was 95° C. prior to corona discharge treatment and 90° C. after corona discharge treatment. The blocking resistance was 1.05 kg/12 cm², and the total haze was 1.7%. The results of evaluation are shown Table 1.

Reference Example 1

Except that 56 grams of liquified 1-butene, 224 grams of liquified propylene, 4.9 μmol trityltetrakis (pentafluorophenyl) borate were used for polymerization and that the polymerization was continued at 25° C. for 1 hour, the procedures of Example 1 were repeated to yield 96 grams of a propylene-1-butene copolymer. The content of 1-butene in the copolymer obtained was 17.7% by weight. The melting point and the intrinsic viscosity [η] were respectively 116° C. and 0.39 dl/g. The heat-sealing temperature of a film having a sealant layer prepared from the copolymer was 105° C. both before and after corona discharge treatment. However, the film lost its clarity in the process of preparation. The blocking resistance was 0 kg/12 cm².

Reference Example 2

Except that 84 grams of liquified 1-butene, 196 grams of liquified propylene, 4.9 μmol ethylenebis(indenyl) zirconium dichloride, and 4.9 μmol trityltetrakis (pentafluorophenyl) borate were used for polymerization and that the polymerization was continued at 25° C. for 1.5 hours, the procedures of Example 1 were repeated for Reference Example 2 to yield 51 grams of a propylene-1-butene copolymer. The content of 1-butene in the copolymer obtained was 24.7% by weight. The melting point and the intrinsic viscosity [η] were respectively 104° C. and 0.42 dl/g. The heat-sealing temperature of a film having a sealant layer prepared from the copolymer was 92° C. before corona discharge treatment and 101° C. after corona discharge treatment. The film lost its clarity in the process of preparation. The blocking resistance was 0 kg/12 cm$^2$. The total haze was 15.7%. The results of the evaluation are shown in Table 1.

Reference Example 3

Except that 140 grams of liquified 1-butene, 140 grams of liquified propylene, 4.9 μmol ethylenebis(indenyl) zirconium dichloride, and 4.9 μmol trityltetrakis (pentafluorophenyl) borate were used for polymerization and that the polymerization was continued at 25° C. for 1.5 hours, the procedures of Example 1 were repeated for Reference Example 3 to yield 25 grams of a propylene-1-butene copolymer. The content of 1-butene in the copolymer obtained was 43.1% by weight. The melting point and the intrinsic viscosity [η] were respectively 78° C. and 0.41 dl/g. The heat-sealing temperature of a film having a sealant layer prepared from the copolymer was 55° C. both before and after corona discharge treatment. The blocking resistance was greater than 2 kg/12 cm$^2$ and was thus unmeasurable. The total haze was equal to 1.6%. The results of the evaluation are shown in Table 1.

Reference Example 4

A sealant layer was prepared from SUMITOMO NOBLENE 180G (propylene-1-butene copolymer manufactured by SUMITOMO CHEMICAL CO., LTD.; content of 1-butene=22.9% by weight; melting point=138° C.; intrinsic viscosity [η]=1.86 dl/g). A film prepared in the same manner as in Example 1 had a heat-sealing temperature of 90° C. before the corona discharge treatment. The blocking resistance was greater than 2 kg/12 cm$^2$ and was thus unmeasurable. The total haze was 0.4%. The results of the evaluation are shown in Table 1.

Reference Example 5

A 3-liter stainless steel autoclave equipped with a stirrer was purged with nitrogen gas, and 1.0 liter of n-hexane that had been purified with activated alumina, 4.4 mmol triethylaluminum, and 0.33 mmol cyclohexylethyldimethoxysilane were introduced into the autoclave with application of a hydrogen pressure of 100 mmHg. Ninety-four grams of liquified propylene and 100 grams of liquified 1-butene were further introduced into the autoclave, and the autoclave was heated to a polymerization temperature of 50° C. A hexane slurry of a solid catalyst (27 mg) was prepared according to the method specified in Examples 2(A) and 2(B) in JP-A-1-319,508, the complete disclosure of which is incorporated herein by reference. The slurry was further introduced with propylene gas into the autoclave. Polymerization was executed with a continuous supply of propylene gas at a pressure of approximately 4.0 kg/cm$^2$ at a temperature of 50° C. for two hours. Non-reacted monomers were purged from the product of polymerization, and ash was removed by addition of 3.0 ml of propylene oxide. The contents of the autoclave were poured into an approximately four-fold volume of ethanol. Polymers precipitated were dried at 60° C. under reduced pressure for 4 hours to yield 161 grams of a propylene-1-butene copolymer. The content of 1-butene in the copolymer obtained was 21.0% by weight. The melting point and the intrinsic viscosity [η] were respectively 131° C. and 2.03 dl/g. The heat-sealing temperature of a film having a sealant layer prepared from the copolymer was 105° C. prior to corona discharge treatment and 114° C. after corona discharge treatment. The blocking resistance was 1.59 kg/12 cm$^2$, and the total haze was 1.3%. The results of the evaluation are shown in Table 1.

Reference Example 6

Polymerization

A 1-liter stainless steel autoclave equipped with a stirrer was purged with nitrogen gas. Eighty-four grams of liquified 1-butene and 196 grams of liquified propylene were introduced into the autoclave, and the autoclave was cooled to a polymerization temperature of 0° C.

A 100 mL flask with a magnetic stirrer was also purged with nitrogen gas. In an atmosphere of nitrogen, 10 mL of toluene that had been purified with activated alumina, 1.75 mmol (relative to the concentration of aluminum atoms) of polymethylalumoxane (modified methylalumoxane commercially available by Tosoh-Akzo), and 5.6 μmol of ethylenebis(indenyl)zirconium dichloride were mixed with stirring for five minutes at ambient temperature. The mixture was then introduced into the 1 liter autoclave, and the autoclave was kept at 0° C. for one hour for polymerization. The polymerization was stopped by injection of 10 mL of isobutyl alcohol with stirring for another 30 minutes. Non-reacted monomers were purged from the product of polymerization, and the contents of the autoclave were poured into approximately 2 liters of ethanol. Polymers precipitated were dried at 60° C. for 4 hours to yield 84 grams of a propylene-1-butene copolymer. The content of 1-butene in the copolymer obtained was 29.6% by weight. The melting point and the intrinsic viscosity [η] were respectively 97.5° C. and 0.50 dl/g.

Preparation of Film and Evaluation of Physical Properties

The preparation of a film and evaluation of physical properties of the film were executed in the same manner as Example 1. The heat-sealing temperature of the film having a sealant layer prepared from the copolymer was 75° C. prior to corona discharge treatment and 77° C. after corona discharge treatment. The blocking resistance was 1.13 kg/12 cm$^2$, and the total haze was 3.1%. The results of the evaluation are shown in Table 1.

Reference Example 7

Except that 56 grams of liquified 1-butene and 224 grams of liquified propylene were used for polymerization and that the polymerization temperature was 25° C., the procedures of Reference Example 6 were repeated to yield 193 grams of a propylene-1-butene copolymer. The content of 1-butene in the copolymer obtained was 22.6% by weight. The melting point and the intrinsic viscosity [η] were respectively 110° C. and 0.41 dl/g. The heat-sealing temperature of a film having a sealant layer prepared from the copolymer was 99° C. before corona discharge treatment and 104° C. after corona discharge treatment. The film lost its clarity in the process of preparation, and the blocking resistance was 0 kg/12 cm$^2$. The total haze was 10.6%. The results of evaluation are shown in Table 1.

Reference Example 8

Polymerization

A 3-liter stainless steel autoclave equipped with a stirrer was purged with nitrogen gas. After 1.0 liter of toluene purified with activated alumina, 27 grams of liquified 1-butene, and 108 grams of propylene gas were introduced into the autoclave, the autoclave was heated to a polymerization temperature of 50° C.

A 100 mL flask with a magnetic stirrer was also purged with nitrogen gas. In an atmosphere of nitrogen, 10 mL of toluene that had been purified with activated alumina, 10.9 mmol (relative to the concentration of aluminum atoms) of polymethylalumoxane (modified methylalumoxane commercially available by Tosoh-Akzo), and 4.4 μmol of ethylenebis(indenyl)hafnium dichloride were mixed with stirring for five minutes at ambient temperature. The mixture was then introduced with propylene gas into the 3 liter autoclave. Polymerization was executed with a continuous supply of propylene gas at a pressure of approximately 6.0 kg/cm$^2$ and a temperature of 50° C. for one hour. The polymerization was stopped by injection of 10 mL of isobutyl alcohol with stirring for another 30 minutes. Nonreacted monomers were purged from the product of polymerization, and the contents of the autoclave were poured into approximately 5 liters of ethanol. Polymers precipitated were dried at 60° C. for 4 hours to yield 41 grams of a propylene-1-butene copolymer. The content of 1-butene in the copolymer was determined to be 13.3% by weight by $^{13}$C-nuclear magnetic resonance spectroscopy. The melting point was measured to be 109° C. with the differential scanning calorimeter. The intrinsic viscosity [η] measured in tetralin at 135° C. was 2.35 dl/g.

Preparation of Film and Evaluation of Physical Properties

The preparation of a film and evaluation of physical properties of the film were executed in the same manner as Example 1. The heat-sealing temperature of the film having a sealant layer prepared from the copolymer was 93° C. prior to corona discharge treatment and 91° C. after corona discharge treatment. The blocking resistance was 0.65 kg/12 cm$^2$, and the total haze was 4.9%. The results of evaluation are shown in Table 1.

While the invention has been described in detail and with reference to specific embodiments thereof, it will be apparent to those of ordinary skill in the art that various changes and modifications can be made therein without departing from the spirit and scope thereof.

(A) the content of said α-olefin component in said propylene random copolymer is in the range of about 6% to about 40% by weight;

(B) the intrinsic viscosity (η) measured in tetralin at 135° C. of said propylene random copolymer is not lower than about 0.45 dl/g and not higher than about 5.0 dl/g;

(C) the melting point (Tm) measured by a differential scanning calorimeter and the content of 20° C. xylene soluble faction (CSX) for said propylene random copolymer fulfill a relationship of $Tm \leq 140 - 35.693 \log_{10}(CSX)$; and (D) a structure having two or more adjacent methylene units —(CH$_2$)— in a molecular chain of said propylene random copolymer can be detected by $^{13}$C-NMR spectroscopy when no ethylene is used to prepare said propylene random copolymer.

2. The propylene random copolymer according to claim 1, wherein the content of the α-olefin component is 15 to 30% by weight.

3. The propylene random copolymer according to claim 1, wherein the =-olefin is 1-butene and the content of the 1-butene component is 14.1 to 30% by weight.

4. The propylene random copolymer according to claim 1, wherein said content of said α-olefin component is in the range of about 7% to about 35% by weight.

5. The propylene random copolymer according to claim 1, wherein said α-olefin is 1-butene.

6. The propylene random copolymer according to claim 1, wherein said propylene random copolymer is prepared with use of a catalytic system, said catalytic system comprising the following catalytic components:

(1) a group IVB transition metal compound having one or more cyclopentadienyl groups;

(2) a compound capable of reacting with said group IVB transition-metal compound to form a stable anion; and (3) an organoaluminum compound.

7. The propylene random copolymer according to claim 6, wherein said catalytic components (1), (2), and (3) respectively comprise:

TABLE 1

| | Content of 1-butene (% by weight) | Melting point (° C.) | CXS % | (Melting point) Calcd = 140 −35.693 log$_{10}$CXS | (η) dl/g | Two or more Methylene units | Heat-sealing temperature (° C.) Before corona discharge treatment | After corona discharge treatment | Blocking kg/12 cm$^2$ | Transparency oriented film: Total haze (%) |
|---|---|---|---|---|---|---|---|---|---|---|
| Example 1 | 7.2 | 137 | 0.9 | 141 | 0.60 | Exist | 121 | 121 | 0 | 1.4 |
| Example 2 | 18.9 | 119 | 1.0 | 140 | 0.57 | Exist | 101 | 104 | 0.27 | 1.3 |
| Example 3 | 25.2 | 108 | 2.1 | 129 | 0.55 | Exist | 89 | 91 | 0.50 | 0.9 |
| Example 4 | 7.8 | 132 | 1.3 | 136 | 0.46 | Exist | 120 | 117 | 0.35 | 0.9 |
| Example 5 | 14.1 | 112 | 0.2 | 164 | 2.26 | Exist | 95 | 90 | 1.05 | 1.7 |
| Reference 1 | 17.7 | 116 | 3.3 | 121 | 0.39 | Exist | 105 | 105 | 0 | 9.1 |
| Reference 2 | 24.7 | 104 | 9.7 | 105 | 0.42 | Exist | 92 | 101 | 0 | 15.7 |
| Reference 3 | 43.1 | 78 | 99 | 88.8 | 0.41 | Exist | 55 | 55 | 2.0< | 1.6 |
| Reference 4 | 22.9 | 138 | 15 | 98.0 | 1.86 | Not Exist | 90 | 111 | 2.0< | 0.4 |
| Reference 5 | 21.0 | 131 | 7.2 | 109 | 2.03 | Not Exist | 105 | 114 | 1.59 | 1.3 |
| Reference 6 | 29.6 | 98 | 38 | 83.7 | 0.50 | Exist | 75 | 77 | 1.13 | 3.1 |
| Reference 7 | 22.6 | 110 | 16 | 97.1 | 0.41 | Exist | 99 | 104 | 0 | 10.6 |
| Reference 8 | 13.3 | 109 | 0.3 | 159 | 2.35 | Exist | 93 | 91 | 0.65 | 4.9 |

What is claimed is:

1. A propylene random copolymer comprising a propylene component and an α-olefin component having 4 to 10 carbon atoms, wherein (1) a zirconium or hafnium compound having a chiral cyclopentadienyl ring;

(2) a compound containing tetrakis(pentafluorophenyl) borate; and (3) triethylaluminum or tri(isobutyl)aluminum.

8. The propylene random copolymer according to claim 6, wherein said transition metal-component is a zirconium or hafnium compound having a multidentate ligand prepared by linking at least two groups selected from the group consisting of an indenyl group, a substituted indenyl group, and a partial hydride of a substituted indenyl group bridged via a lower alkylene group.

9. The propylene random copolymer according to claim 6, wherein said compound (2) capable of reacting with said transition-metal compound to form a stable anion is selected from the group consisting of trityltetrakis (pentafluorophenyl) borate, N,N-dimethylaniliniumtetrakis (pentafluorophenyl) borate, and trityltetrakis (pentafluorophenyl) aluminate.

10. The propylene random copolymer according to claim 1, wherein said copolymer is used to form a film having:

a blocking resistance of less than about 1.2 kg/12 cm$^2$, a haze of less than about 1.8%, and heat-sealing temperatures of less than about 125° C. both before and after corona discharge treatment, wherein the change in heat-sealing temperature with corona discharge treatment is not more than about 5° C.

11. The propylene random copolymer according to claim 1, wherein said range of α-olefin component is between about 15% to about 30% by weight.

12. The propylene random copolymer according to claim 1, wherein said intrinsic viscosity is not lower than about 0.45 dl/g and not higher than about 3.0 d/g.

13. The propylene random copolymer according to claim 1, wherein said relationship between Tm and CXS is $$Tm \leq 137-35.693 \log_{10}(CXS).$$

14. A propylene random copolymer comprising a propylene component and an α-olefin component having 4 to 10 carbon atoms, wherein (A) the content of said α-olefin component in said propylene random copolymer is in the range of about 6% to about 40% by weight;

(B) the intrinsic viscosity (η) measured in tetralin at 135° C. of said propylene random copolymer is not lower than about 0.45 dl/g and not higher than about 5.0 dl/g;

(C) the melting point (Tm) measured by a differential scanning calorimeter and the content of 20° C. xylene soluble faction (CSX) for said propylene random copolymer fulfill a relationship of $$Tm \leq 140-35.693 \log_{10}(CSX);\text{ and}$$

(D) a structure having two or more adjacent methylene units —(CH$_2$)— in a molecular chain of said propylene random copolymer can be detected by $^{13}$C-NMR spectroscopy when no ethylene is used to prepare said propylene random copolymer, wherein the propylene random copolymer is prepared with the use of a catalytic system, said catalytic system comprising the following catalytic components:

(1) a group IVB transition metal compound having one or more cyclopentadienyl groups;

(2) a compound capable of reacting with said group IVB transition-metal compound to form a stable anion and (3) an organoaluminum compound.

* * * * *